June 17, 1930.                G. GOODWIN                1,764,622
                          OPTICAL SIGNAL DEVICE
                          Filed March 3, 1928
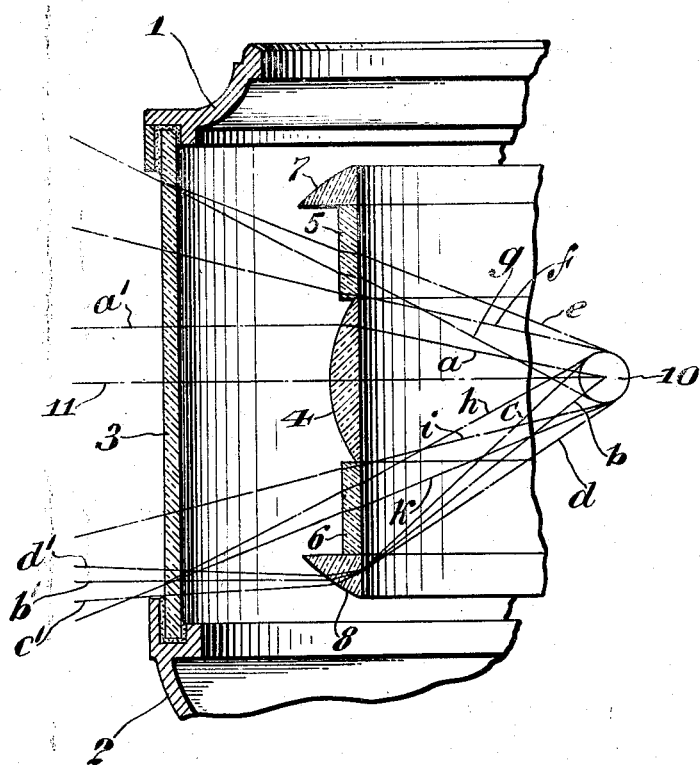
Inventor
George Goodwin
By Cyrus N. Anderson
                                                    Attorney Patented June 17, 1930

1,764,622

UNITED STATES PATENT OFFICE

GEORGE GOODWIN, OF BRENTFORD, ENGLAND, ASSIGNOR TO AMERICAN GASACCUMULATOR COMPANY, OF ELIZABETH, NEW JERSEY, A CORPORATION OF NEW JERSEY

OPTICAL SIGNAL DEVICE

Application filed March 3, 1928, Serial No. 258,812, and in Great Britain March 23, 1927.

My invention relates to optical signal devices, more particularly such devices as are employed upon floating buoys located upon the waters of rivers, lakes, the ocean or branches of the latter.

It has been found that when the usual dioptric lens system is employed in association with a light in known manner upon a floating buoy it may happen that when a vessel is approaching a buoy so provided and is within a certain relatively short distance thereof, persons on the bridge are unable to see or observe the light. It also has been found that persons near the water, as those who may occupy a small boat, and who may be relatively near the buoy, are unable to observe the same because they are out of line with the beam of light or light rays which issue from the light source through the lenses of the device.

The general object of the present invention is to provide an optical device of the general character above indicated including novel means whereby the light rays emanating from the source of light associated with the device are visible to persons located near the device in positions either near the surface of the water or at relatively great height above such surface.

It also is an object of the invention to provide a dioptric light including means whereby the said light may be rendered visible not only from points or positions which are located relatively long distances from the light but also from points or positions relatively near the said light.

A further object of the invention is to provide a device including lenses such as are employed in a dioptric light in association with means whereby the spread of the rays from the said device in vertical directions may be increased or widened.

To these and other ends my invention comprehends the construction and arrangement of parts as hereinafter described in detail, set forth in the claims, and as shown in the drawing in which I have illustrated one form of device in which the invention is embodied and the principle thereof illustrated. However, it is to be understood that the invention is susceptible of embodiment in other forms of construction than that shown and that changes in the details of construction to include elements of other form which may be equivalents of those shown in the drawing may be made within the scope of the claims without departing from the said invention or the principle thereof.

In the drawing I have shown a single view in vertical longitudinal section of one side portion of a structure embodying the said invention, the said view being taken in a vertical plane extending radially from the axis of the structure.

I have not shown the frame or supporting structure of the device because my invention does not relate to that portion of the structure but only to the light refractive elements of the device through which the light rays from a source of light located at the center or focal point of the lenses embodied in the structure pass.

I have shown at 1 and 2 fragmentary portions of the associated frame structure in order that its relation to the optical device may be apparent. The optical device is inclosed or encircled by a sheet of transparent material 3, usually glass. The optical device comprises a centrally located lens 4 of known circular shape which is plane upon its inner side and convex upon its outer side, as is clearly shown. The lens 4 consists of transparent material, preferably glass.

In the construction as illustrated, I have provided upon opposite sides of the lens 4 circular bands 5 and 6 of transparent material, preferably glass. These bands 5 and 6 are of rectangular shape in cross section as shown. It is to be understood that if desired one of the said bands may be omitted and also that in such event the usual lenses of the well known dioptric device employed in light-houses, buoys and the like may be substituted therefor. Lenses 7 and 8, of known construction, are located outside of and in contact with the outer edges of the circular glass bands 5 and 6. The outer surfaces of the said lenses 7 and 8 are convex as shown.

The source of light, which usually consists of a gas flame, is indicated at 10 and is located at the focal point of the lens system.

In the case of the dioptric light as usually and heretofore constructed the rays of light from the source 10, after passing through the lenses of the device, would extend outwardly therefrom in a beam more or less restricted or limited in its transverse area, in consequence of which it has been found that persons located upon the bridge of a vessel or ship closely approaching a buoy have been out of the line of the rays and consequently have been unable to notice or observe the buoy. Likewise, persons located in a small boat, as a row-boat, and being therefore positioned near the surface of the water and being located near the buoy, have been out of line with the rays of light from the light source which have passed through the lenses of the system.

In the present structure, wherein the bands of glass 5 and 6 are included, this objection is avoided because the rays of light from the source 10 which pass through the bands 5 and 6 of transparent material extend therefrom in divergent relation with respect to a horizontal plane indicated by the dash and dot line 11. The direction of the rays of light from the light source 10 after they have passed through the refractive elements of the device is clearly shown in the drawing. These rays which emanate from the center of the source of light will, after passage through and refraction by the lenses 4 and 7 and 8, be parallel. For instance, the rays $a$ and $b$ which emanate from the center of the light and pass through and are refracted respectively by the lenses 4 and 8, take the directions $a'$ and $b'$ respectively, after refraction, parallel with the center dash and dot line 11, whereas the rays $c$ and $d$ emanating from the opposite sides of the said source of light 10 and passing through and being refracted by the lens 8 take the directions $c'$ and $d'$, as shown, which are slightly divergent. The lens 7 effects a like result. The rays of light emanating from the source of light 10 and passing through the bands 5 and 6 continue, after their passage therethrough, in directions parallel with their directions before passage therethrough and in divergent relation to the center horizontal plane of the device indicated by the dash and dot line 11. The rays of light from the source 10 which pass through the bands 5 and 6 are indicated at $e$, $f$, $g$, $h$, $i$ and $k$.

As has been stated already, one of the bands 5 or 6 may be omitted, in which event the lenses which usually occupy the position occupied by such band will remain.

The essential feature of the invention is the providing of means upon one or both sides of the central lens 4 whereby the rays of light which pass therethrough from the source of light are divergent to such extent that a person located near the device at a point near the surface of the water or at a point high above such surface is able to observe or see the light and thereby be apprised of its presence.

Having thus described my invention, what I claim and desire to secure by Letters Patent is:

1. In an optical signal device, the combination of a central condensing lens, a source of light located practically at the focal point of said lens, a band of transparent material located in adjoining relation to an edge of said lens, the opposing sides of the said band being parallel with each other, and a condensing lens located outside of said band and in adjoining relation thereto.

2. In an optical signal device, the combination of a central condensing lens, transparent members located in adjoining relation to the opposite edges of the said condensing lens, the opposite surfaces of the said transparent members being parallel with each other, condensing lenses located in adjoining relation to the outer edges of the said transparent members, and a source of light located practically at the focal point of the said lenses.

3. In a dioptric light, the combination of a central light condensing lens and a band of transparent material located in adjoining relation to an edge of said lens, the opposite sides of said band being parallel with each other, and means in adjoining relation to an outer edge of said band through which the rays from the light source pass and from which they issue in divergent relation with respect to each other.

4. A light signal device of drum type comprising a central condensing lens, bands of transparent material located in adjoining relation to the opposite edges of said lens through which rays of light pass and after issuing therefrom extend in divergent relation with respect to a horizontal medial plane passing through said lens, the opposite sides of said bands of transparent material being parallel to each other, and a lens in adjoining relation to the outer edges of said bands through which rays of light from the light source of the said device pass.

In testimony that I claim the foregoing as my invention, I have hereunto signed my name this 15th day of February, 1928.

GEORGE GOODWIN.